Patented Aug. 13, 1940

2,211,144

UNITED STATES PATENT OFFICE 2,211,144

TREATMENT OF RUBBER

William E. Messer, Cheshire, Conn., assignor, by mesne assignments, to United States Rubber Company, New York, N. Y., a corporation of New Jersey No Drawing. Application February 3, 1938, Serial No. 188,456

10 Claims. (Cl. 260—800)

This invention relates to the treatment of rubber and similar oxidizable materials, and more particularly to a new class of deterioration retarders.

An object of the invention is to provide a new class of anti-oxidants or age resisters for organic substances which tend to deteriorate by absorption of oxygen from the air, for example goods of rubber or allied gums, unsaturated fatty oils such as unsaturated vegetable oils, essential oils, petroleum oils and their derivatives such as gasolines, soaps, aldehydes, synthetic resins, turpentine, paints and the like. A further object of the invention is to provide chemicals which additionally act as flex-improvers or anti-flex cracking agents for vulcanized rubber such as tire treads, which undergo repeated strains during use. Further objects will be apparent from the following description.

According to the invention rubber and the like as aforesaid, is treated with a perimidine compound having the general formula

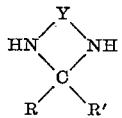

where Y is a peri-aromatic nucleus, and R and R' each represent hydrogen or a hydrocarbon group (unsubstituted or substituted). Preferably such groups are one of the following: alkyl, aryl, aralkyl.

Exemplary of such compounds are 2,2-dimethyl-2,3-dihydro perimidine, 4 - hydroxy - 2 - ethyl-2-methyl-2,3-dihydro perimidine, 6,7-ethylene - 2,3 - dihydro perimidine, 2,2 - cyclopenta - methylene 6-methyl-2,3-dihydro-perimidine, 2-phenyl-2,3-dihydro perimidine, etc. The materials may be made by reacting together a peridiamine and a ketone or aldehyde. The numbering system corresponds to that shown in volume 30, Chem. Abstracts, page 9693.

The materials have special and outstanding properties in connection with the preservation of rubber and vulcanized rubber goods. The effectiveness of chemicals of this class for retarding oxidation of rubber is illustrated by the results of standard accelerated ageing and flexing tests on commercial rubber compounds using, 2,2-dimethyl-2,3-dihydro perimidine which is a nearly colorless, crystalline material melting at about 117° C. T is tensile in lbs./sq. in. and E is percent elongation at break.

|  | Control | |
|---|---|---|
|  | A | B |
| Smoked sheets | 100 | 100 |
| Carbon black | 45 | 45 |
| Zinc oxide | 5 | 5 |
| Pine tar | 3.50 | 3.50 |
| Zinc soap of cocoanut oil fatty acids | 3.50 | 3.50 |
| Sulfur | 3.00 | 3.00 |
| Mercaptobenzothiazole (accelerator) | 1.00 | 1.00 |
| 2,2-dimethyl-2,3-dihydro perimidine |  | 1.00 |

| Minutes cure at 30 lbs./sq. in. steam pressure | A | | B | |
|---|---|---|---|---|
|  | T | E | T | E |
| UNAGED | | | | |
| 45' | 3900 | 700 | 4150 | 716 |
| 60' | 4120 | 676 | 4250 | 680 |
| 75' | 4060 | 663 | 4150 | 653 |
| 90' | 3840 | 643 | 4020 | 640 |
| AGED 96 HOURS IN OXYGEN | | | | |
| 45' | 1400 | 490 | 2400 | 603 |
| 60' | 1130 | 413 | 2100 | 496 |
| 75' | 1100 | 403 | 1840 | 490 |
| 90' | 1140 | 400 | 1400 | 370 |
| AGED 96 HOURS AT 212° F. | | | | |
| 45' | 1400 | 153 | 2300 | 253 |
| 60' | 1100 | 140 | 2040 | 223 |
| 75' | 1040 | 126 | 2000 | 213 |
| 90' | 1440 | 163 | 1940 | 216 |

FLEXING (KILOCYCLES)

Totals

| | | |
|---|---|---|
| Unaged | 940 | 2215 |
| Aged in oxygen (48 hrs.) | 595 | 650 |
| Aged in oven (24 hrs.) | 400 | 470 |

Where the term "rubber" is used herein it is to be construed broadly as including caoutchouc, balata, gutta percha, and similar vulcanizable gums, as well as synthetic rubbers, rubber isomers, reclaimed rubber, etc. and natural or artificially-prepared latices.

It is also to be understood that other desired filling and compounding ingredients may be incorporated along with the preservative, for example, in the case of rubber, there may be incorporated other accelerators, softeners, etc.

The antioxidant may be incorporated in any type of rubber composition, such as those used for automobile tires and tubes, hose, belting, sheet and thread rubber, rubberized fabrics, molded goods, boots and shoes, etc., whether vulcanized in a mold, in open steam, in hot air, or in the cold by the so-called acid process. The proportion of the anti-oxidant may vary from about 0.1% to 5%, although either smaller or greater proportions may be found useful. If the material to which it is added is a liquid such as rubber cement or an oil, the antioxidant may be dissolved therein in a suitable small proportion. The antioxidant may be incorporated into solid substances by milling or mastication, and prepared for incorporation into dispersions or solutions either in powder, paste or solution form, or applied in such forms for incorporation by diffusion, to the surfaces of vulcanized or unvulcanized rubber goods.

Having thus described my invention, what I claim and desire to protect by Letters Patent is:

1. Method of preserving organic substances which tend to deteriorate by absorption of oxygen from the air which comprises incorporating therein a perimidine compound having the general formula

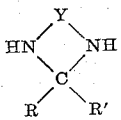

where Y is a peri-naphthylene nucleus, and R and R' each are one of the radicals hydrogen and a hydrocarbon group.

2. Method of preserving organic substances which tend to deteriorate by absorption of oxygen from the air which comprises incorporating therein a perimidine compound having the general formula

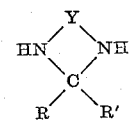

where Y is a peri-naphtho group, and R and R' each are one of the radicals hydrogen and a hydrocarbon group.

3. Method of preserving organic substances which tend to deteriorate by absorption of oxygen from the air which comprises incorporating therein a 2-alkyl-substituted 2,3-dihydro-peri-naphthoperimidine compound.

4. Method of preserving organic substances which tend to deteriorate by absorption of oxygen from the air which comprises incorporating therein a 2-alkyl-substituted 2,3 dihydro peri-naphthoperimidine compound.

5. Method of preserving organic substances which tend to deteriorate by absorption of oxygen from the air which comprises incorporating therein 2,2-dialkyl-2,3-dihydro peri-naphthoperimidine.

6. An organic substance which tends to deteriorate by absorption of oxygen from the air containing a perimidine compound having the general formula

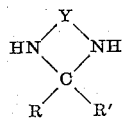

where Y is a peri-naphthylene nucleus, and R and R' each are one of the radicals hydrogen and a hydrocarbon group.

7. An organic substance which tends to deteriorate by absorption of oxygen from the air containing a perimidine compound having the general formula

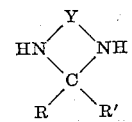

where Y is a peri-naphtho group, and R and R' each are one of the radicals hydrogen and a hydrocarbon group.

8. An organic substance which tends to deteriorate by absorption of oxygen from the air containing a 2-alkyl-substituted 2,3-dehydro-peri-naphthoperimidine compound.

9. An organic substance which tends to deteriorate by absorption of oxygen from the air containing a 2-alkyl-substituted 2,3 dihydro peri-naphthoperimidine compound.

10. An organic substance which tends to deteriorate by absorption of oxygen from the air containing 2,2-dialkyl-2,3-dihydro peri-naphthoperimidine.

WILLIAM E. MESSER.